United States Patent
Kremerman

(10) Patent No.: US 10,029,188 B2
(45) Date of Patent: Jul. 24, 2018

(54) INTEGRATED DISTILLATION CHAMBER AND DISCHARGE UNIT WITH INTEGRATED KEY

(71) Applicant: Elliot Kremerman, Scotts Valley, CA (US)

(72) Inventor: Elliot Kremerman, Scotts Valley, CA (US)

( * ) Notice: Subject to any disclaimer, the term of this patent is extended or adjusted under 35 U.S.C. 154(b) by 0 days.

(21) Appl. No.: 15/886,962

(22) Filed: Feb. 2, 2018

(65) Prior Publication Data

US 2018/0161693 A1  Jun. 14, 2018

Related U.S. Application Data

(63) Continuation-in-part of application No. 15/668,177, filed on Aug. 3, 2017, now Pat. No. 9,895,626.

(51) Int. Cl.
| | | |
|---|---|---|
| *B01D 3/32* | (2006.01) | |
| *B01D 5/00* | (2006.01) | |
| *B01J 19/30* | (2006.01) | |

(52) U.S. Cl.
CPC .............. *B01D 3/32* (2013.01); *B01D 5/006* (2013.01); *B01D 5/009* (2013.01); *B01D 5/0051* (2013.01); *B01J 19/30* (2013.01)

(58) Field of Classification Search
CPC ............. B01D 3/32; B01D 5/006; B01J 19/30
See application file for complete search history.

(56) References Cited

U.S. PATENT DOCUMENTS

| | | | | |
|---|---|---|---|---|
| 1,418,691 A * | 6/1922 | Anders | ..................... | B01D 3/00 422/531 |
| 2,383,377 A * | 8/1945 | Evans | ................... | G01N 25/145 202/190 |
| 2,427,142 A * | 9/1947 | Hornbacher | ......... | G01N 25/145 165/11.1 |
| 2,468,872 A * | 5/1949 | Goldsbarry | .......... | B01D 3/4205 202/185.1 |
| 2,701,789 A * | 2/1955 | White | ................... | B01D 3/4205 202/161 |
| 3,240,682 A * | 3/1966 | Gordon | ................... | G01N 25/14 202/158 |
| 3,334,025 A * | 8/1967 | Reid | ........................ | B01D 3/00 202/161 |
| 3,334,966 A * | 8/1967 | Shepherd | .................. | C01B 6/10 423/294 |
| 3,607,662 A * | 9/1971 | Glover | ..................... | B01D 3/14 202/160 |
| 3,812,010 A * | 5/1974 | Nitsch | ...................... | C13K 3/00 127/41 |

(Continued)

*Primary Examiner* — Jonathan Miller
(74) *Attorney, Agent, or Firm* — Michael J. Feigin, Esq.; Feigin and Fridman

(57) ABSTRACT

A distillation unit multiple rejection areas at each of a top of a flask and a top of a lower distillation tube in embodiments. A middle distillation tube is narrower than the lower tube and extends into the lower distillation tube as well as a fraction collector. A distillation key with rings extends downwards through the fraction collector, middle distillation tube, and lower distillation tube, a portion of the distillation key and the lower distillation tube extending into a flask where product to be purified is placed. In this manner, the flask itself acts as a heat jacket in addition to having a heat jacket around all the afore-described parts.

21 Claims, 16 Drawing Sheets

(56) References Cited

U.S. PATENT DOCUMENTS

| | | | | |
|---|---|---|---|---|
| 3,837,830 A * | 9/1974 | Eberhart | ................. | B01L 3/569 |
| | | | | 422/935 |
| 5,164,049 A * | 11/1992 | Clark | ....................... | B01D 1/02 |
| | | | | 134/12 |
| 5,354,428 A * | 10/1994 | Clark | ....................... | B01D 1/02 |
| | | | | 159/DIG. 19 |
| 5,873,980 A * | 2/1999 | Young | ................. | B01D 5/0063 |
| | | | | 196/98 |
| 9,682,331 B2 * | 6/2017 | Kremerman | ............ | B01D 3/10 |
| 9,895,626 B2 * | 2/2018 | Kremerman | ............ | B01D 3/32 |
| 9,895,627 B2 * | 2/2018 | Kremerman | ............ | B01D 3/32 |

\* cited by examiner

INTEGRATED DISTILLATION CHAMBER AND DISCHARGE UNIT WITH INTEGRATED KEY

FIELD OF THE DISCLOSED TECHNOLOGY

The disclosed technology relates generally to distillation and, more specifically, to a distillation chamber with an integrated distillation key and multiple vapor rejection areas.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

The inventor's prior patented technologies involved the development and use of a distillation key to more accurately distill fractions of distillate products. While this was and is a great improvement over the prior art, the ultimate goal is be able to distill accurately and quickly fractions within as minute of a temperature difference as possible.

A standard distillation head tends to have a temperature gradient extending from a bottom to the a top thereof, as the heat source is beneath the distillation head and the distillate is a gas rising up from the bottom. Using an infrared camera, differences in heat were measured on a single jacket (single gas insulated layer) distillation head. A noticeable distance along the side the surface was dispersing heat. A very hot section was found in the middle (substantially or exactly 40% to 60% of the distance from the bottom port to the top port) of a main vertical elongated channel of the head. Both the top and bottom had an extended head gradient away from the center, each being cooler than the center.

As such, one can summarize that during (fractional) distillation, the lowest section has the bulk of temperature loss to the surroundings. This would be expected to be the hottest region as it is most near the heat source, but in practice, condensate sits in the lower area (defined as "lowest ⅓ or ¼" of the vertical elongated chamber") causing vapors that pass through this section and become more cooled.

Based on the above tests, and Newton's law of cooling, it has been found that a maximum amount of heat is reached, compared to the input temperature, in any distillation head. The head is exposed to the atmosphere creating a thermal conductive effect from the glass to the air, and even more so if the air is flowing at high speeds such as when using a ventilated fume hood. The core, a central hollow region where vapors pass through, thus also has a maximum temperature with little change based on the input temperature.

Thus, there is a need to find a way to distill with greater efficiency and separation of compounds, while preventing vapors from re-condensing back into the product being distilled.

SUMMARY OF THE DISCLOSED TECHNOLOGY

A distillation unit of embodiments of the disclosed technology has a jacket (a region of glass which surrounds other area but is designed to lack a pathway for vapors to flow through) and various tubes which function as a pathway for vapor flow. These tubes for vapor flow include a lower distillation tube partially surrounded by the jacket, the lower tube being crimped (having alternating larger and smaller cross sections at an interior thereof where vapors are designed to flow) in embodiments of the disclosed technology. A middle distillation tube extends into a region circumscribed by the lower distillation tube. "Circumscribed" is defined as "surrounding by, in at least one plane." A fraction collector circumscribes, on an opposite side/other end of the middle distillation tube.

The distillation unit, in embodiments of the disclosed technology, further has a distillation key which, in turn, has a plurality of circumferential rings extending transverse to a length of the distillation key. The distillation key can extend entirely through a vertical extent of the fraction collector and the middle distillation tube while being entirely spaced apart from the middle distillation tube. The distillation key can further extend into a lower distillation tube without touching the tube itself because it is entirely spaced apart therefrom.

The distillation key can form a unitary structure with the jacket, such as by being attached to and/or connecting to and/or touching the jacket or interior side thereof. In embodiments, the sole point of connection of the distillation key to the rest of the distillation unit is at a top of the distillation key where it is attached to the distillation unit.

A portion of the lower distillation tube is unprotected by any insulative region, in embodiments of the disclosed technology. Thus, a jacket or other protective region is lacking around a portion of what can be a single layer of glass of the lower distillation tube. This portion which is unprotected by the rest of the distillation head be placed into a flask or other exterior device to which heat is applied and a product (solid and/or liquid) is to be distilled. In this manner, the walls of the flask (or other device beneath the distillation unit and surrounding the uninsulated region of the distillation head/lower distillation tube) serve to "insulate" this portion of the lower distillation tube.

A bellowed region of the jacket (defined as a portion which has a greater cross sectional area than rest of the jacket/a region which gradually increases in width) abuts the flask while a portion of the lower distillation tube is surrounded by the flask, in some embodiments. Where "longitudinal" is used in the disclosure, this should be understood to be defined as horizontal or extending perpendicular to a vertical length of the distillation unit.

A first rejection area for vapors is between upper walls of the lower distillation tube and outer walls of the middle distillation tube, in some embodiments of the disclosed technology. (The "detailed description" comprises the definition and explanation of "rejection" for purposes of this disclosure.) A second rejection area for vapors is created between walls of the lower distillation tube and upper walls of the flask in some embodiments of the disclosed technology. A "flask" is a separate device for holding a solid or liquid which is abutted against or attached below the distillation head in embodiments of the disclosed technology.

The fraction collector has a bulbous shape with a rounded upper side and flat lower side in some embodiments of the disclosed technology. The fraction collector can have a bottom (lower) side which is perpendicular to a longest vertical length of the jacket and/or the middle distillation tube. A connecting region between the fraction collector and a condenser can include an exit portal there-between. The bottom side of the fraction collector can be continuous and remain horizontal with at least a portion of the connecting region, e.g. they are coplanar in embodiments of the disclosed technology.

Thus, in embodiments, a continuous internal pathway extends through, in order: an interior of the lower distillation tube, the middle distillation tube, the fractional collector, a side exit portal, and a condenser. The condenser can form a unitary piece with the distillation unit as a whole.

In some cases, at least some vapors extend upwards through the pathway and are rejected at a top of the interior of the lower distillation tube in a method of using the distillation unit. Further, in some cases at least some of these or other vapors are rejected by at least some rings of a distillation key. The distillation key can extend through without contacting the middle distillation tube and extend through at least a majority of the lower distillation tube without touching this tube either.

The crimped glassware of the lower distillation tube can have many inner crimps and outer crimps, the inner crimps having smaller cross sectional areas than the outer crimps but the inner and outer respectively being equal to each other in cross sections in some embodiments. The inner crimps cause turbulent flow of vapors moving upwards, helping to reject some of the vapors in embodiments of the disclosed technology.

The distillation unit, described slightly differently, can have a distillation key attached to a top side of the distillation unit. A fraction collector is found with the distillation key extending through from end to end entirely (top to bottom). A middle distillation tube, narrower (in width) than the fraction collector, has extending there-through the same distillation key form end to end (top to bottom). A lower distillation tube, wider than the middle distillation tube, has the distillation key extends at least partially there-through. The distillation key, in embodiments, is spaced apart from and/or does not contact the middle distillation tube or lower distillation tube in embodiments of the disclosed technology. The middle distillation tube can extend into both the fractional collector and the lower distillation tube.

The middle distillation tube extends into the lower distillation tube, creating an area between the lower distillation tube and the middle distillation tube (e.g. around the outside of the middle distillation tube) which terminates an upward pathway from a lower opening of the lower distillation tube. The lower distillation tube, in turn, can itself have a variety of wider and narrower regions.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

Figure 1:
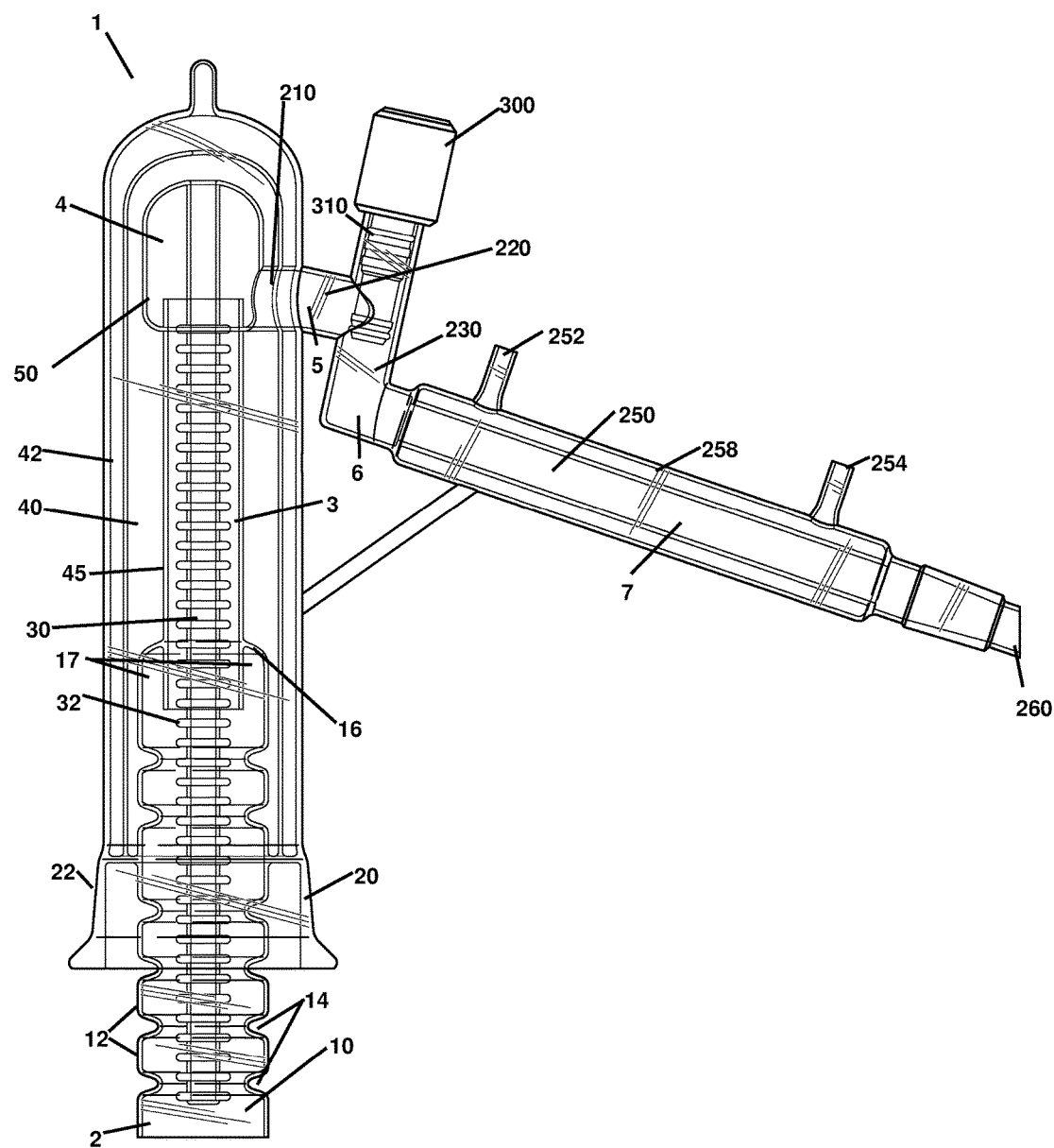
FIG. 1 shows an a side elevation view of distillation unit with stopper used in embodiments of the disclosed technology.

A distillation unit multiple rejection areas at each of a top of a flask and a top of a lower distillation tube in embodiments. A middle distillation tube is narrower than the lower tube and extends into the lower distillation tube as well as a fraction collector. A distillation key with rings extends downwards through the fraction collector, middle distillation tube, and lower distillation tube, a portion of the distillation key and the lower distillation tube extending into a flask where product to be purified is placed. In this manner, the flask itself acts as a heat jacket in addition to having a heat jacket around all the afore-described parts.

The distillation head or unit of the disclosed technology is used for first pass and subsequent pass of a material being refined. Prior art heads are thermally connected with solid glass having the connection portal at the joint itself. This means that temperatures can "wick/absorb" into surrounding glass very easily. In the devices of the disclosed technology, the head (inner lower section 10, the part thereof which is below the outer tube 22) is into a flask which is over the fire and/or has product to be distilled. (The numbers refer to the labels in the Figures which are described in more detail below.) This allows hot vapor to surround the inner bore glass pathway, and initially utilize the surrounding area to keep the central area hotter at the connection region than without. The internal heat pathway 2, in this manner, is kept separate from the side walls (e.g. exterior of jacket 42 and the sidewalls of a flask between a heat source and the distillation head) at all areas of the head, especially the lower connection region 20 where the head interfaces with a flask there-below. The pathway is suspended and isolated within a flask and jackets 40 and 42 at all regions including at the lowest extremities of the device. Further, an upper region of the pathway 4 has a bulbous fraction collector 50 which isolates upper vapor molecules and diverts them from the system and flow path of the exit/condensation tube preventing rejection of some vapors.

Further, commonly distillation heads use Vigoreux indents or even perforated plates with drain tubes. This, however, reduces throughput of distillation. Liquid collects in this area and can be counterproductive to distillation even though this has been common practice for the last hundred years. Instead, the present technology uses a series of crimped areas of glass 12/14 (alternating areas with a small and larger cross sectional area) which is made with current technology and previously unable to produce on a mass scale or with the strength needed for vigorous distillation at high temperatures. The inner regions 12 with smaller cross sectional areas are between multiple wider regions 14 with larger cross sectional areas.

In the present technology, there are further two stages of refinement in one monolithic pathway. The first section of the pathway 2 is in a wider piece of glass tube 10, with the crimped sections 14. This forces the distillate being collected on the surface to forcefully climb up the curved internal glass on the walls. This effect replaces Vigoreux usage or plates of the prior art. However, this approach only works because there is a distillation key 30 in the center. Without the key 30, the vapors simply pass upwards through a path of least resistance without being rejected all returning downwards, causing a much greater temperature gradient. A smallest possible temperature gradient is desired in order to more accurately remove fractions at various temperatures, especially when the fractions have extremely close boiling points which can be less than 1 degree Celsius.

There is an added pathway placed over the main pathway with a extended piece of glass 45 that protrudes downwards into the first pathway. All the distillate climbing the surface will enter this uniquely shaped and constructed area of the lower rejection area 17 having rounded upper side walls 16 joining with the tubular glass 45 of the second region. This causes rejected distillate to fall back down. The remainder vapor will now enter the second pathway 3 and travel up utilizing, in embodiments of the disclosed technology, the upper section of the key for further refinement. All of this can be carried out with the pathway otherwise in a vacuum.

Typical heads manufactured have one pathway. There may be theoretical plates but the vapor travels in a laminar fashion and moves upwards. Even though there can be obstructions to offer more surface area during distillation, prior art pathways allow a lot of impurities that easily travel along the side of the glass and move upwards with the condensation effect on the glass. In the present technology, the length of vertical pathway is increased in some embodiments and a dual pathway where one pathway has a cuffed section is dedicated to a specific distillation reaction. Then the top where it enters the first section has a transition area (lower collector) that rejects material downwards. The lower rejection area 16 prevents anything from the the lower section moving upward except vapors which have been sufficiently purified. The purified vapors now enter the upper distillation path 3 of the vertical region to be further refined before entering the upper fractional collector 40 in the pathway region 4.

To test the system, in one test two pumping systems were used. A freshly extracted oleoresin was prepared with ethanol at temperatures below 0 Celsius. This was placed through ultra cold containment to crash out the precipitated wax formation and unwanted large contaminated bodies of material mass left behind as well as dissolved heavy mass particulates that coagulate at lower temperatures. Now the solution is heated and placed on a sealed vessel with carbon to saturate and mix. The solution is then filtered over a bed of silica material to remove carbon. Removal of the solvent, in this case ethanol, was used. The solvent is to be removed via evaporation. The product is now nearly dried as a resin in evaporator and now hexane/cyclohexane can be applied. At a 1:1 solution was added into the evaporator to dissolve the resin into a suspended solution. This solution was applied in a small reactor/separatory device. It was noted very carefully that the use of highly saturated salt water was used to remove as many water soluble compounds as possible, the use of this hardened and carried the salt water PH over to the prepared material after around 15-20 separations were performed. The PH was around 10, and was increasingly hardened after each wash so a solution of deionized water was prepared at a PH of 5.0. This solution was rinsed over and over again (at least five times) until the prepared hexane solution met 6.5-7 PH.

The prepared and washed solution was returned to a neutral PH of around 6.5 and then placed inside of a Summit Industrial Supply SPD®-3 20 liter distillation apparatus. A volatile head adapter from summit industrial supply was also used to remove the hexane in a rapid fashion. The same head was used concurrent through the stages of solvent removal to increased solution temperatures in the SPD®-3 system up to 160 c. With the use of a 4 c vario diaphragm pump to remove both the volatiles solvents as well as water, and anything else left behind right before the use of dual stage oil vane (edwawrds 80) where waters, solvents and volatile compounds contaminate and deplete the vacuum rating.

Once the solution is dried and applied under vacuum under high temperatures the edwards 80 is switched over, and a higher vacuum rating is gradually applied until all lower boiling point reactivity subsides. The Spd® 3 fractional distillation head was installed prior and now initial vacuum pressures are being increased and more distillate is being produced as temperatures go up—the evacuation of mass of the selected fraction is being collected. The average temperature seen on this high speed refinement was 220 Celsius or below with a average rate of 3-4 liters per hour on the first pass when the main body of selected is being collected. It was noted the SPD®-3 produced approx half of that speed on a second pass and further, where this test compared the SPD® 3 to the present technology. The first pass was done in a rapid form to remove the compounds being selected as fast as possible. A cold trap was used, when the trap filled up initially, it was later dumped and a dry glass cap was installed to create a dry vacuum environment and prevent micro planing of molecules from the cold trap.

This first pass distillation product that was collected was now put in either pentane or dcm (dichloramethane) and reduced into a 1:1 ratio again with a different polarity. a second salt water wash is preformed, removing further compounds unwanted. The first salt water wash was only able to remove as much material from the initial wash as possible, noted the time was 30-50× longer to separate due to the material carrying over a highly "gummy effect" where the separation isn't as smooth. The first pass process now reduced the bandwidth of the collected molecules; allowing this next salt water separation to effectively eliminate the greater portions of compounds that are water soluble, leaving only selected and preferred compounds in the solvent layers void from the unwanted water soluble compounds.

The solution separates very fast in the wash, however also hardens the solution. The resulting process from the first wash is now repeated with de-ionized water placed at a 5.0 PH and washed until the solvent layer is reduced to a range of 6.6-7 PH.

The reason the PH needs to be adjusted is because as a distillation occurs, if the PH is too high it actually defeats the efficiency and hardens the product coming out which also deflates the %-potency purity. This is because the PH becomes harder and even darkens the output of the wanted material to be collected. The PH must be reduced to its near natural state so when the distillation occurs and the mass to be distilled is removed—the PH will end in the range of 90, and does not enter the harder PH range.

The nest steps are highly complex in nature. The reason is because on this second distillation and further diffusion pumps are being used and during the initial removal or solvent evaporates off at high temperatures, the diffusion pumps can never see any of those molecules down stream. A notable advance with the dual pathway was the added fraction collector at top that directed vapor and discharge away from the reaction.

Further, it should be noted that the vertical length of the device and distillation pathways 2, 3, and 4 can be varied. For example, FIGS. 17 and 18, as will be discussed below, show a shorter vertical length device which decreases the length of the pathway 2 and 3 but otherwise has the same regions.

Under the high refinement process with the present technology, distillation speeds of 4 or more liters per hour were realized with an end potency/separation of fractions at above 95% purity.

In a second pass of the distillate fractions through the distillation heads, the procedure went as follows. The end fractions were collected, these fractions being very small separations that had to be immediately evaporated and solvent removed or the mixed solvent may react. Once enough of each fraction was collected by an automated chromatography flash machine, these fractions having all solvents evaporated were individually placed in the distillation head of the present technology. The resulting output distillation was single compound resolution post digital chromatography. That is, the output was greater than 99% per distillate with the test machinery unable to detect more than one fraction of distillate product. For practical purposes, the distillate is completely pure refined solution at a rate of speed which is increased 15% beyond the known rates generated from the initial test.

Now referring specifically to the Figures, embodiments of the disclosed technology should become clearer in view of the following description thereof.

Figure 17:
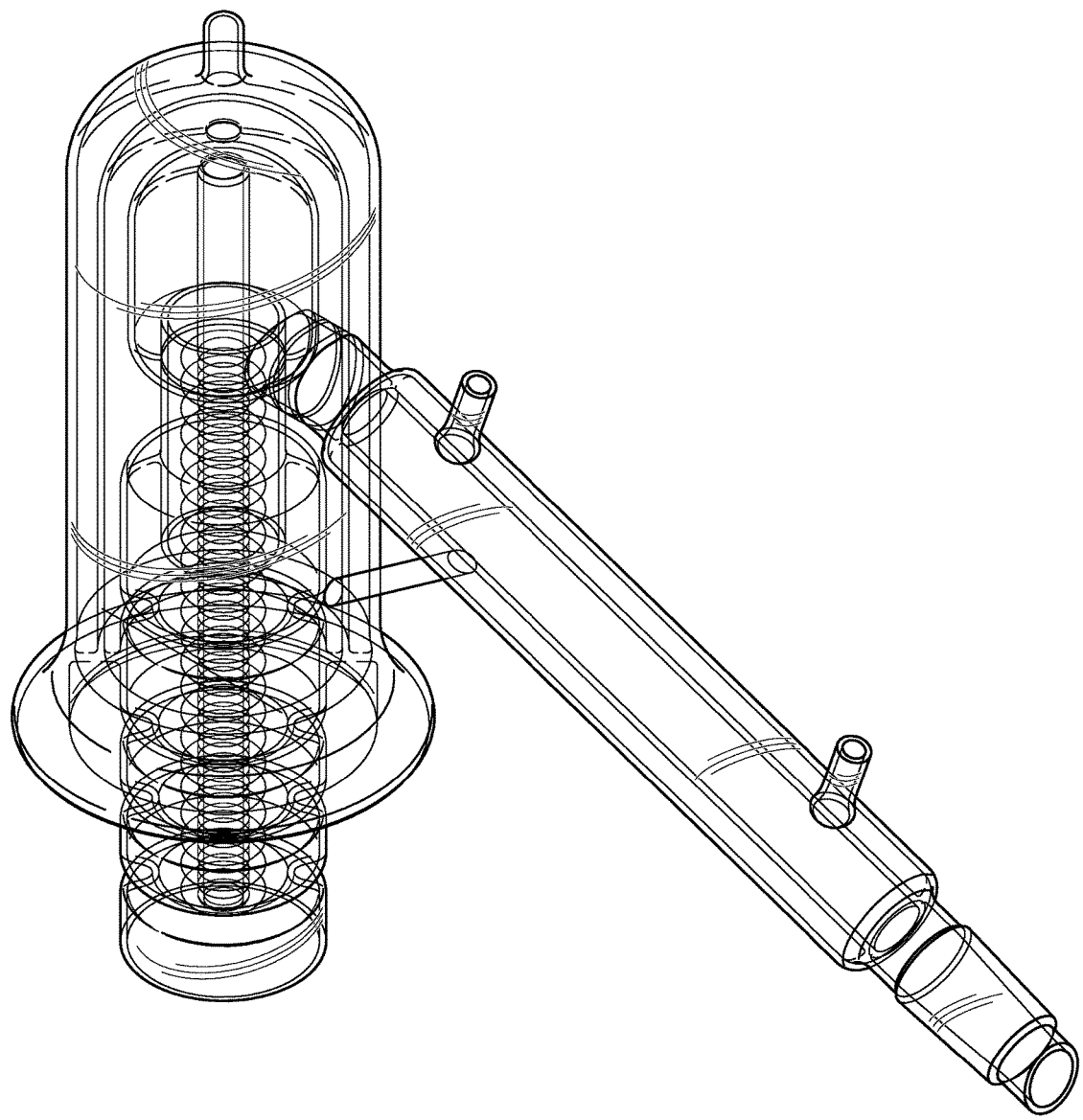
FIG. 17 shows a perspective view of a shorter version of the distillation head in another embodiment of the disclosed technology.
Figure 18:
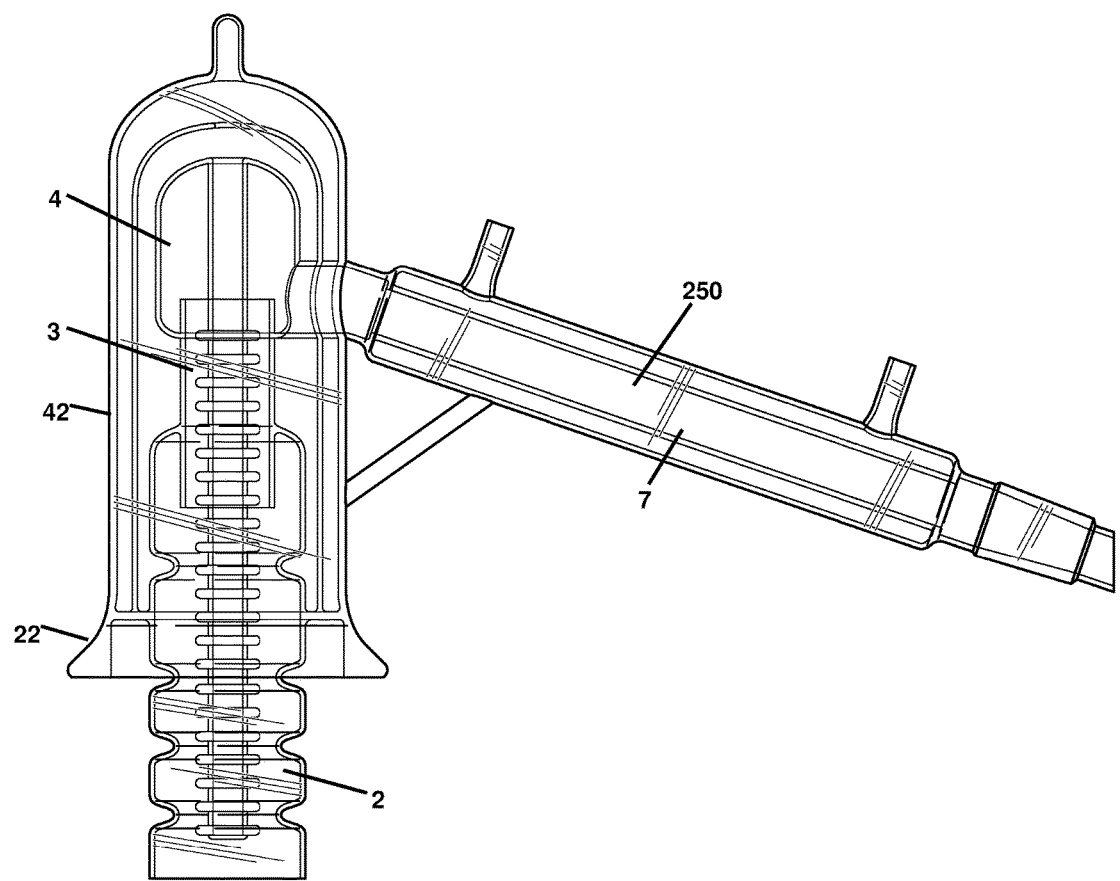
FIG. 18 shows a side elevation view of the shorter version of the distillation head of FIG. 17.

FIGS. 1 through 8 show a "tall" embodiment with a stopper region. FIGS. 9 through 16 show the "tall" embodiment without the stopper region. FIGS. 17 and 18 show a "short" embodiment without the stopper region.

Figure 2:
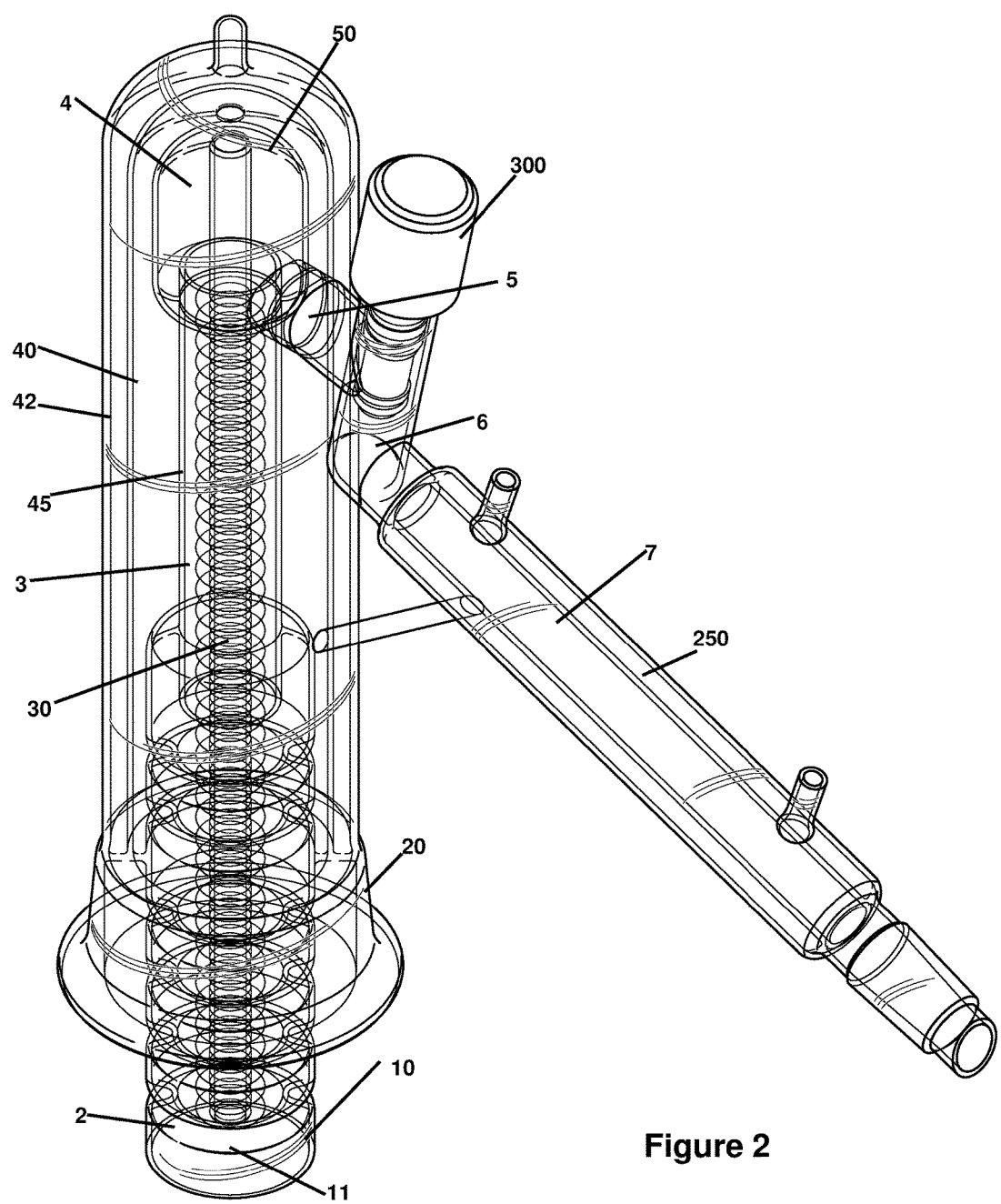
FIG. 2 shows a top perspective view of the distillation unit of FIG. 1.
Figure 3:
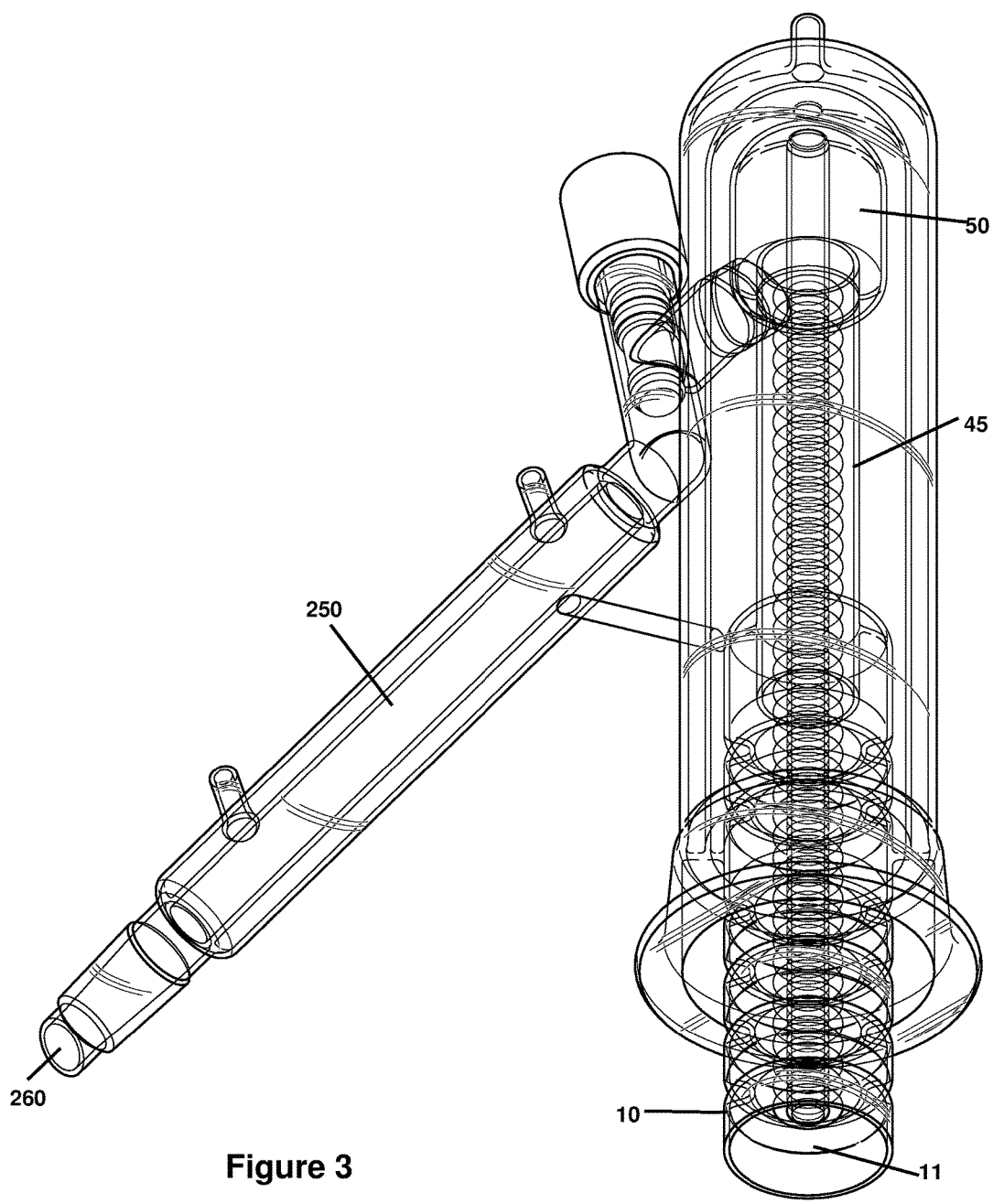
FIG. 3 shows a bottom perspective view of the distillation unit of FIG. 1.
Figure 4:
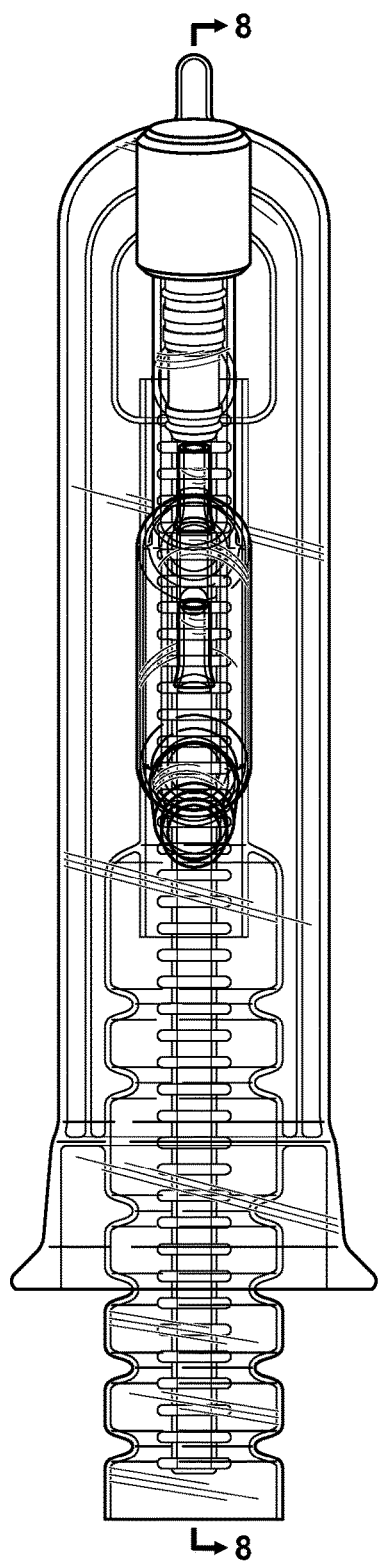
FIG. 4 shows a front elevation view of the distillation unit of FIG. 1.
Figure 5:
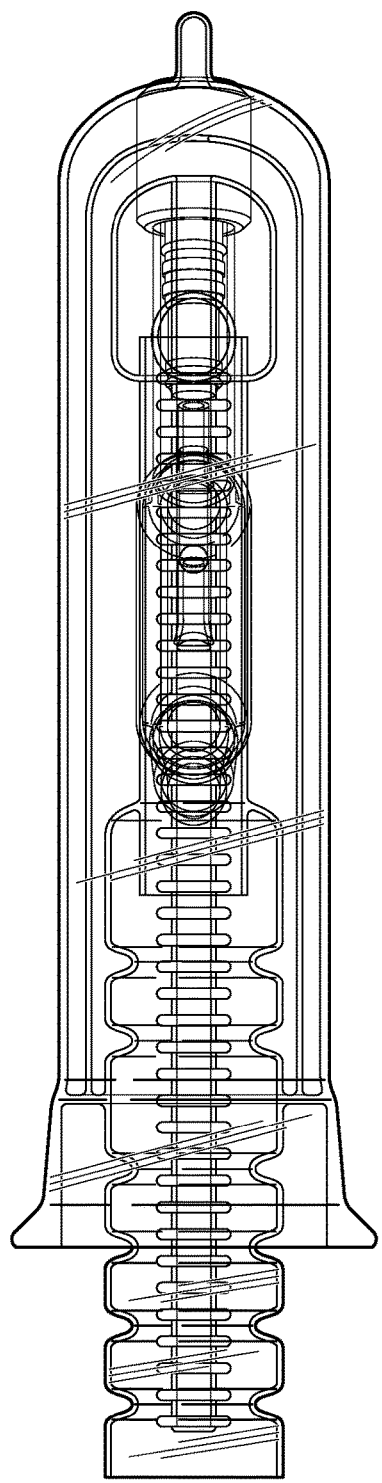
FIG. 5 shows a back elevation view of the distillation unit of FIG. 1.
Figure 6:
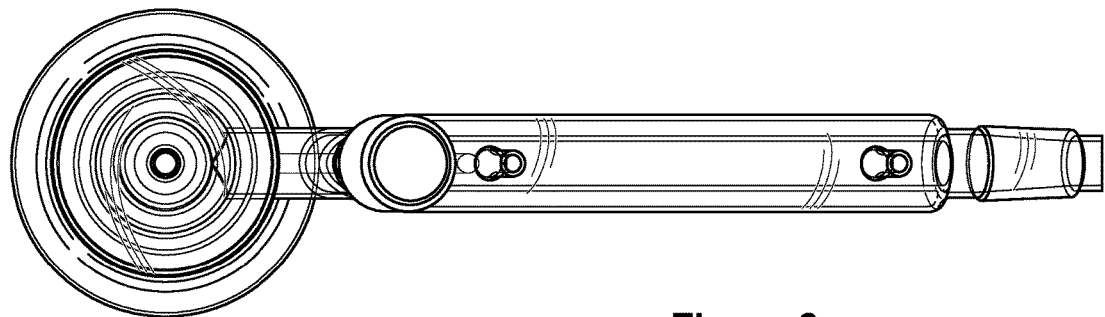
FIG. 6 shows a top plan view of the distillation unit of FIG. 1.
Figure 7:
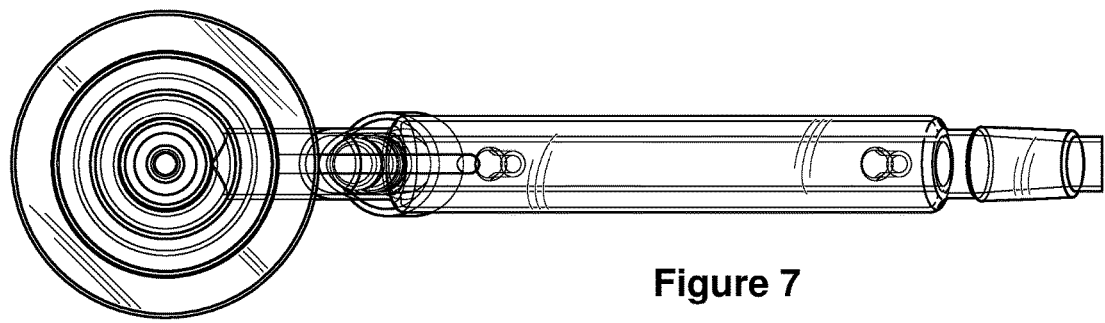
FIG. 7 shows a bottom plan view of the distillation unit of FIG. 1.
Figure 8:
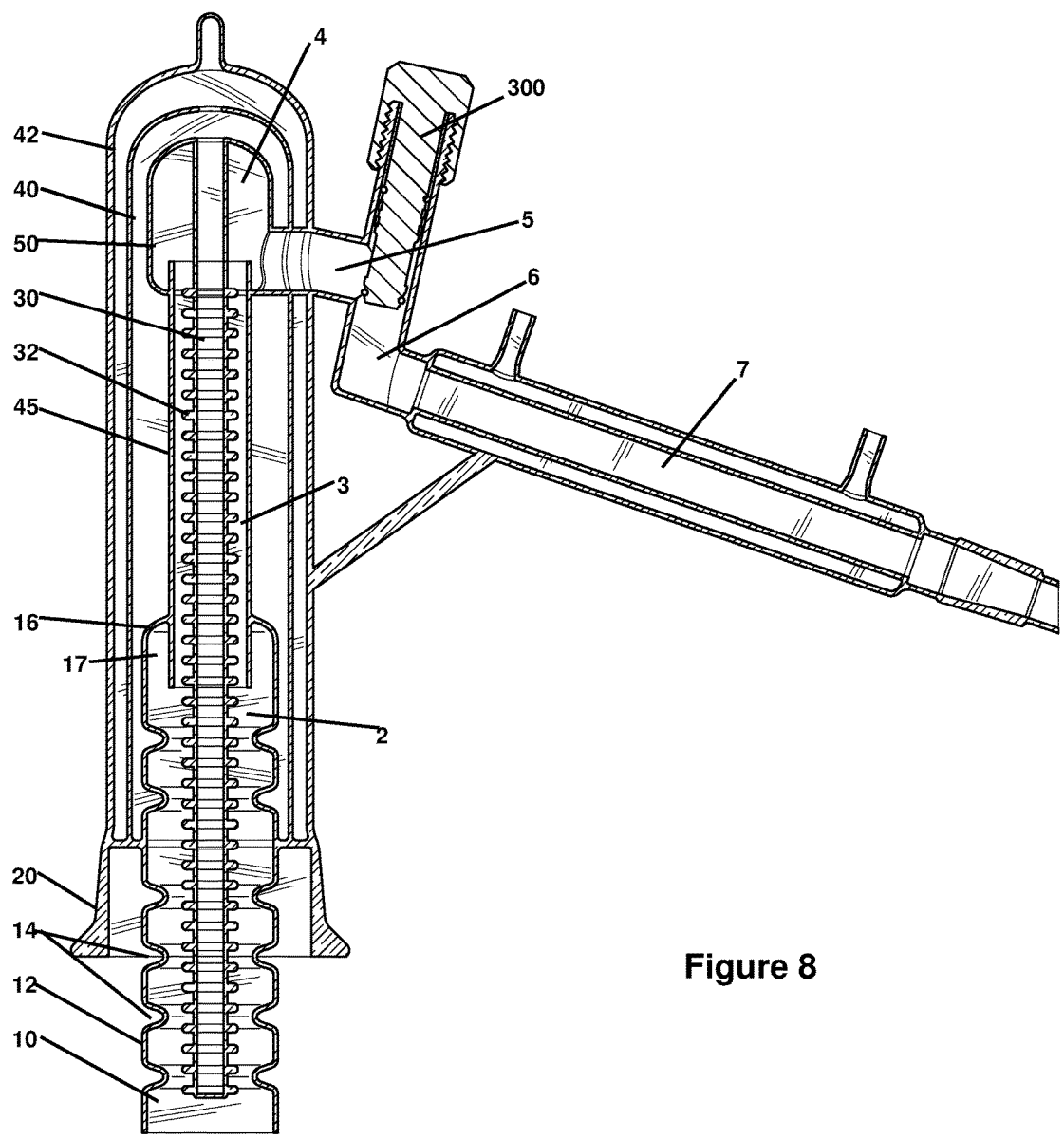
FIG. 8 shows a cutaway side elevation view of the distillation head of FIG. 4 cut along section line 8-8.
Figure 9:
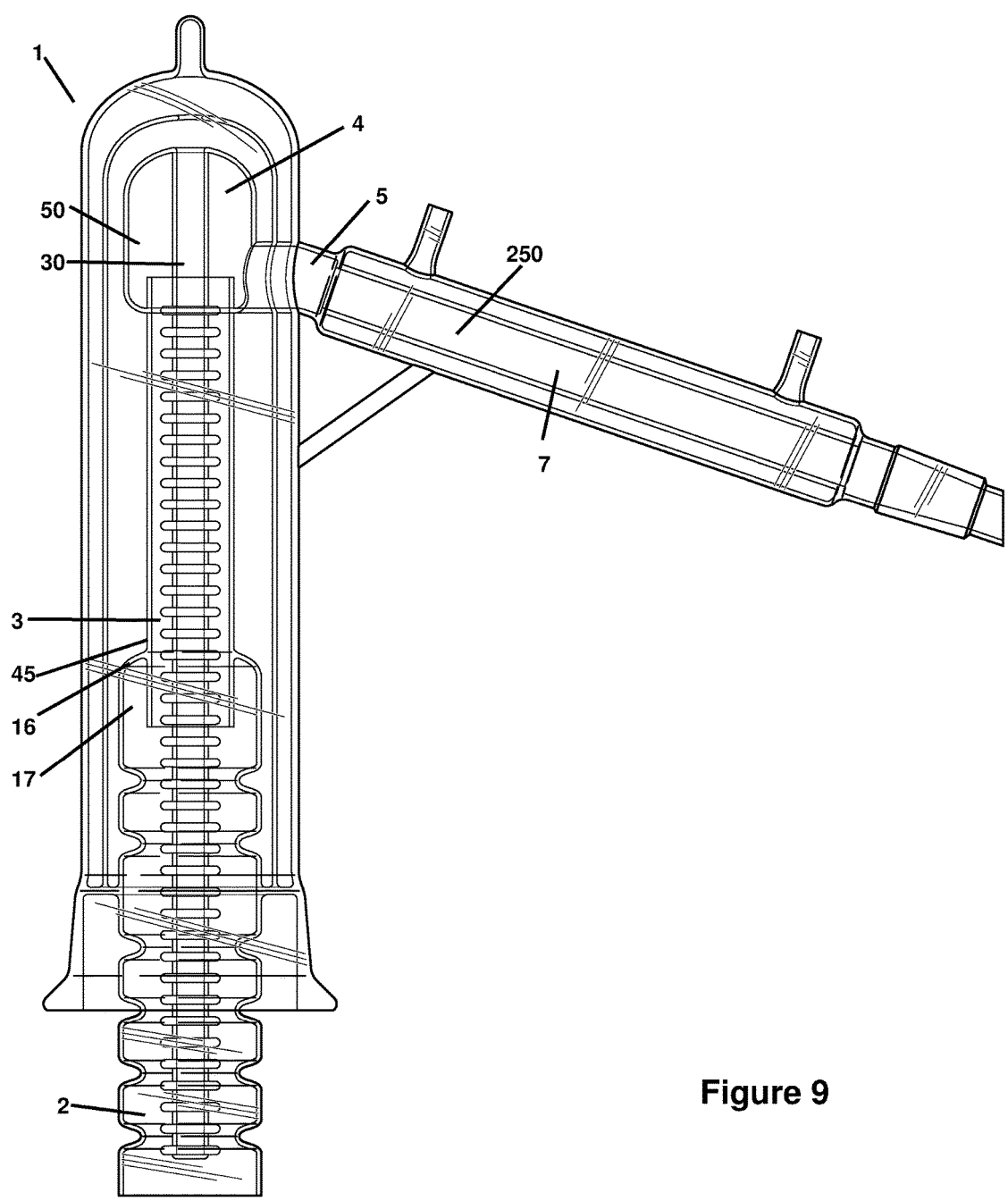
FIG. 9 shows a side elevation view of the distillation head of FIG. 8.

The labels used to describe parts of the figures include:
Pathways
2 lower vertical pathway
3 middle vertical pathway
4 upper vertical pathway
5 exit port pathway
6 corner condensation pathway
7 main condensation pathway
Vertical Distillation Chamber
10 lower distillation tube
11 lower portal
12 outer crimps of the lower distillation tube
14 inner crimps of the lower distillation tube
16 upper extremity of the lower distillation tube and a lower rejection area
17 lower rejection area
20 flask abutment region of the outer tube and/or bellowed region of the outer tube (in some embodiments)
22 outer tube comprising a flask abutment region 20
30 distillation key
32 rings of the distillation key
40 inner jacket
42 outer jacket
50 fraction collector
Exit/Condensation Regions
210 exit port
220 connecting region between the exit port and condensation tube (in some embodiments)
230 vertical connecting region between the connecting region 220 and condensation tube (in some embodiments)
250 condensation tube
258 condensation tube jacket
252 chiller port input/output
254 chiller port output/input
260 condensation exit portal
Stopper
300 stopper (in some embodiments)
310 body of stopper (in some embodiments)
Flask
400 body of flask
410 clamp holding flask to distillation head/unit
420 opening into flask
430 neck of flask Referring first to FIGS. 1 through 8 concurrently, FIG. 1 shows an a side elevation view of distillation unit with stopper used in embodiments of the disclosed technology. FIG. 2 shows a top perspective view of the distillation unit of FIG. 1. FIG. 3 shows a bottom perspective view of the distillation unit of FIG. 1. FIG. 4 shows a front elevation view of the distillation unit of FIG. 1. FIG. 5 shows a back elevation view of the distillation unit of FIG. 1. FIG. 6 shows a top plan view of the distillation unit of FIG. 1. FIG. 7 shows a bottom plan view of the distillation unit of FIG. 1. FIG. 8 shows a cutaway side elevation view of the distillation head of FIG. 4 cut along section line 8-8. FIG. 9 shows a side elevation view of the distillation head of FIG. 8.

The "bottom" of the device is where the lower distillation tube 10 and port 11 are located. The "top" is in the direction of the label 1 of the distillation device itself. A flask is placed below the distillation unit 1 and vapors rise upwards following the pathway in numerical order from 2 to 3 to 4, and the in some embodiments, through 5 and 6, and finally through the condensation tube 7 where the vapors are re-condensed.

A lower region 20 of the outer tube 22 surrounds some of the lower distillation tube 10 and in embodiments, all of a middle distillation tube 45. In this manner, a portion of the lower distillation tube 10 is "exposed" or unprotected from the outer tube 22. This "exposed" region is placed within a flask such that a pathway for heating of a liquid or solid being distilled is protected from the outside environment as the flask itself creates a heat jacket around the distillation path and a distillate product can be rejected into the flask itself before even passing into the distillation unit 1. For purposes of this disclosure, "rejection" of a vapor refers to a process why which vapors are heated and move upwards, but then cool and pass back downwards rather than continue on an upwards path to a next section of a device or next device used in the distillation process. An accepted vapor is one which is heated and continues on an upwards path into another section or device. A "section" is defined as one which is generally enclosed in a recognizable separate region of a device based on a change in width of the path or the like. In the device shown in FIG. 1, the interior of element 10 is one section (corresponding to a lower vertical pathway 2), the interior of element 45 is another pathway (corresponding to a middle vertical pathway 3), the interior of the fraction collector 5 is one section (corresponding to an upper vertical pathway 4), and so forth.

The distillation key 30 has spaced apart rings 32 which extend outwards from a linear spine in embodiments of the disclosed technology. The rings, and the entirety of the device 1 can be made of glass and form a single unitary structure. The distillation key 10 is, in embodiments, connected to a top side of the device and extends downwards through the upper pathway 4 entirety, middle pathway 3 entirely, and at least partially or mostly through the lower pathway 2. In this manner, the distillation key serves to reject or help reject vapors at each ring (each ring being a "section" for this purpose which divides a vertical path by way of the ring spaced there-between). So too, the crimps with outer regions 14 and inner region 12 serve to help reject at each crimp. That is, as rising vapors contact each ring 32 and each crimp 14, turbulent flow is created and the slower moving/less excited particles drop out and fall lower (are rejected) while the faster moving/more excited particles (those with comparatively lower boiling points) continue upwards. By increasing the length of the entire device, one can purify more and more in this manner but must also be able to maintain as constant of a temperature as possible throughout the vertical rise of the device.

At the top of the lower distillation tube 10 is a lower rejection area 17 with an upper most extremity or wall 17. Here the vapors pass upwards through a path of least resistance, in some embodiments, as the opening into this section has a greater circumference than into the middle vertical pathway 3/middle distillation tube 45.

Then, vapors which continue to rise extend into the middle distillation tube 45 which is narrower than the lower distillation tube 10 and has far more turbulent flow due to the small distance between the walls of the tube 45 and the rings 32 of the distillation key 30. At this point, the fractions have been rejected at least twice (once in the flask and once at rejection area 17) so the more fine tuned or exacting rejection is warranted in the middle distillation tube 45 than previously accomplished.

After passing through the middle distillation tube 45 from bottom to top, the vapors enter the fraction collector 50. A purified fraction is now swirling (in some embodiments) through the pathway 4 and condensate falls to the bottom of the fraction collector 50 which is purposefully lower than the middle tube 45 so that the fractions are separated therefrom. Thus, one sees that at each end of the middle tube 45 it passes into the adjacent section, e.g. the fraction collector 50 and the lower tube 10. The lower tube 10 passes into the flask as well. In this manner, rejected vapors or condensed fluids pass downwards rather than continuing on an upwards path and the temperature gradient is kept to a minimum by maximum layers of external protection around each section by other sections. That is, some or all of the vertical pathways described are surrounded by another vertical pathway in part such as at their entrance or exit to decrease heat loss and increase accuracy of rejections. Further, the distillation key 30 is a constant throughout most of the vertical rise of the vapors further helping maintain a constantly in turbulent flow and temperature gradient.

A jacket 40, and in embodiments, a second outer jacket 42 surround a majority of the vertical length of the distillation head while a separate jacket 258 surrounds the condenser and condenser pathway 250. The jackets can be single, double, or triple layered and can have airtight cavities holding air or an inert gas (e.g. argon). The jackets 40 and 42, in embodiments of the disclosed technology, are terminated at a lower end by a lower region 22 which be defined by it's bellowing outwards (having a greater cross-sectional area than the rest of/the upper section of the jacket(s)). The jackets 40 and/or 42 thus surround all of the fraction collector 50, the middle distillation tube 45, and some or a majority of the lower distillation tube 10. In this manner, a portion of the lower distillation tube, such as 5% or greater thereof, and in embodiments, 20%, or 30% or greater thereof is unprotected by a jacket. This portion can go into a mouth of a flask or unit where heat is being applied, the flask itself acting as a sort of jacket and preventing heat loss. The shape of the bellowed region 20 may terminate with a cross-sectional area sized to fit an opening of a flask or over an opening of a flask.

An exit port 210 allows the condensed fractions to exit into a condensation tube 220 where it exits into a condensation tube 250 and out an exit port 260 where the fraction is collected. The condenser can be chilled by way of passing colder fluid (e.g. between 0 and 10 degrees Celsius) through chiller portals 252 and 254 which open into a jacket 268 around the condensation tube 250.

A stopper 300 is used in embodiments of the disclosed technology to close the distillation exit port pathway 5 before the vertical drop to the corner condensation portion 6 of the pathway can be used. This can be done, for example, between each fraction to let one fraction fully exit the portal 260 and clear the condenser 250 before letting the next fraction exit in order to the fraction separated.

Figure 10:
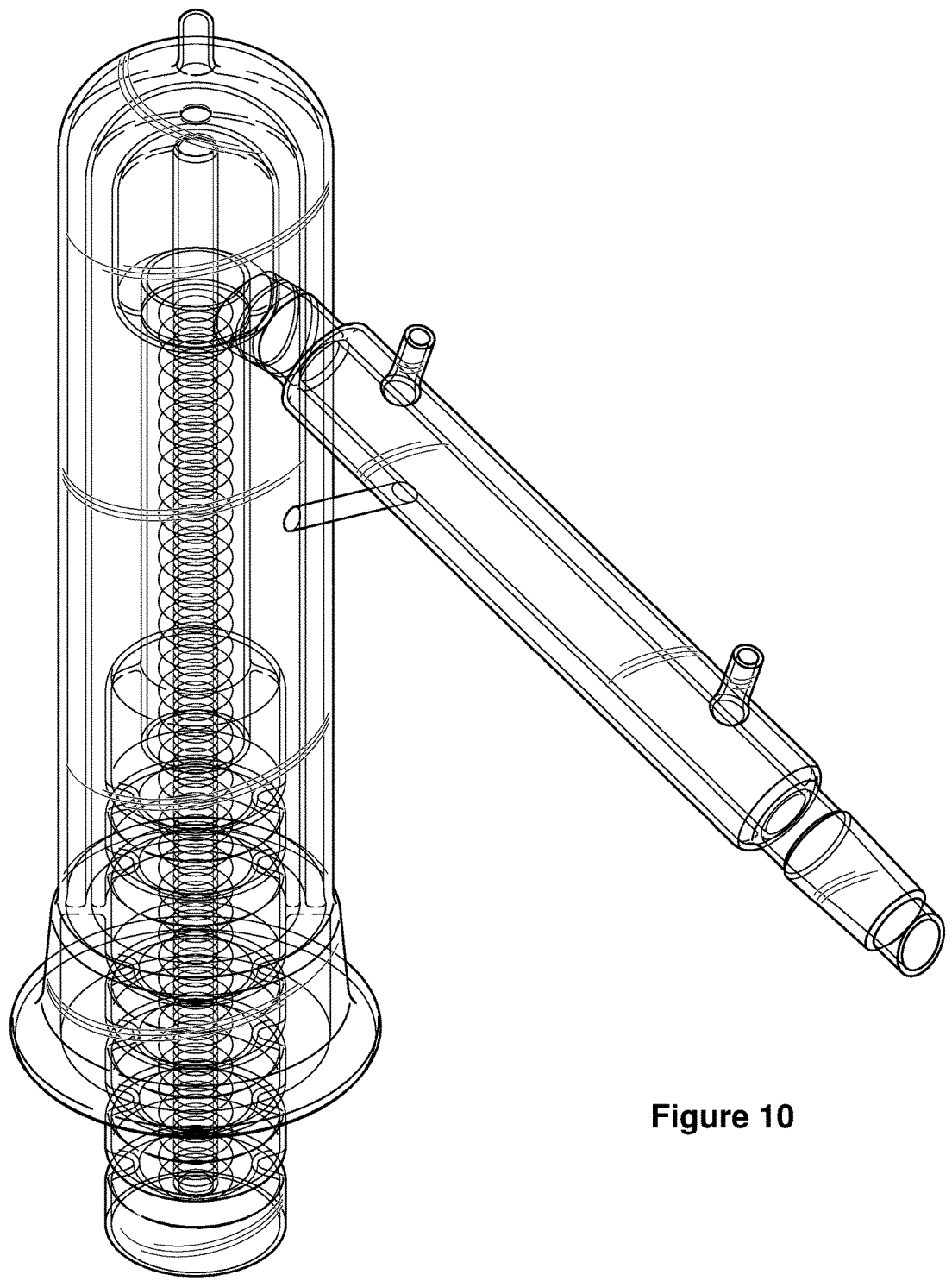
FIG. 10 shows a top perspective view of the distillation unit of FIG. 8.
Figure 11:
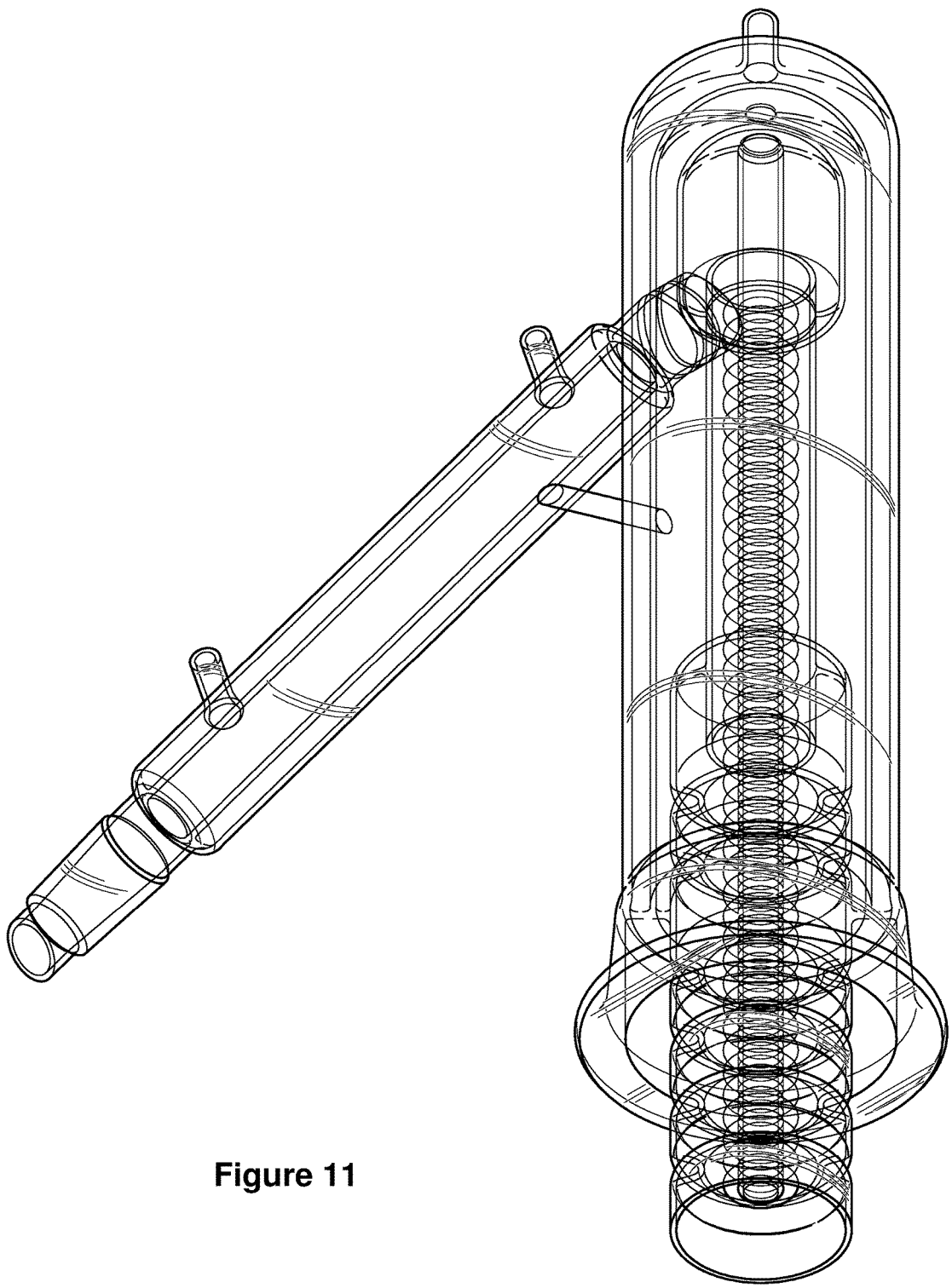
FIG. 11 shows a bottom perspective view of the distillation unit of FIG. 8.
Figure 12:
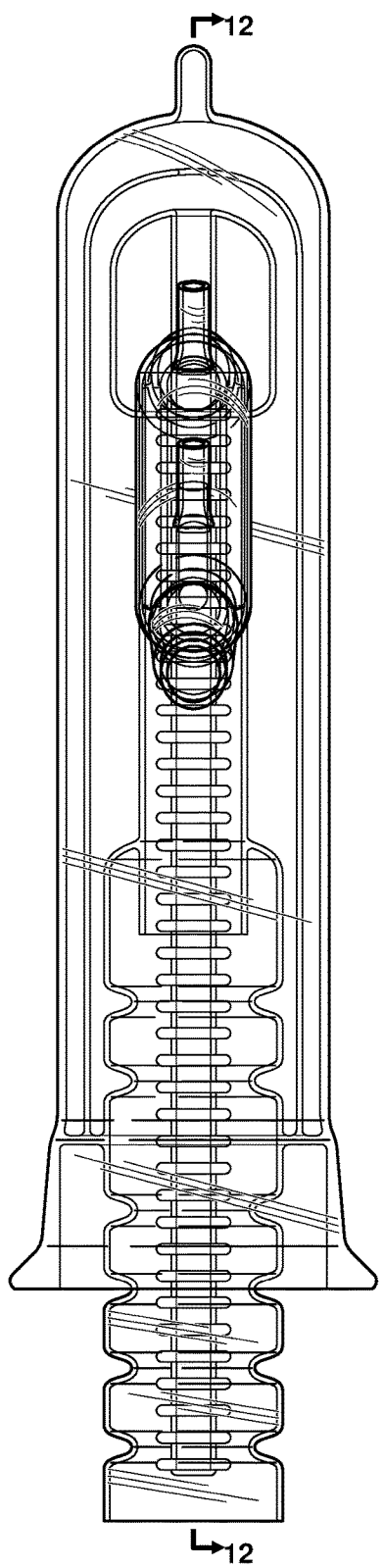
FIG. 12 shows a front elevation view of the distillation unit of FIG. 8.
Figure 13:
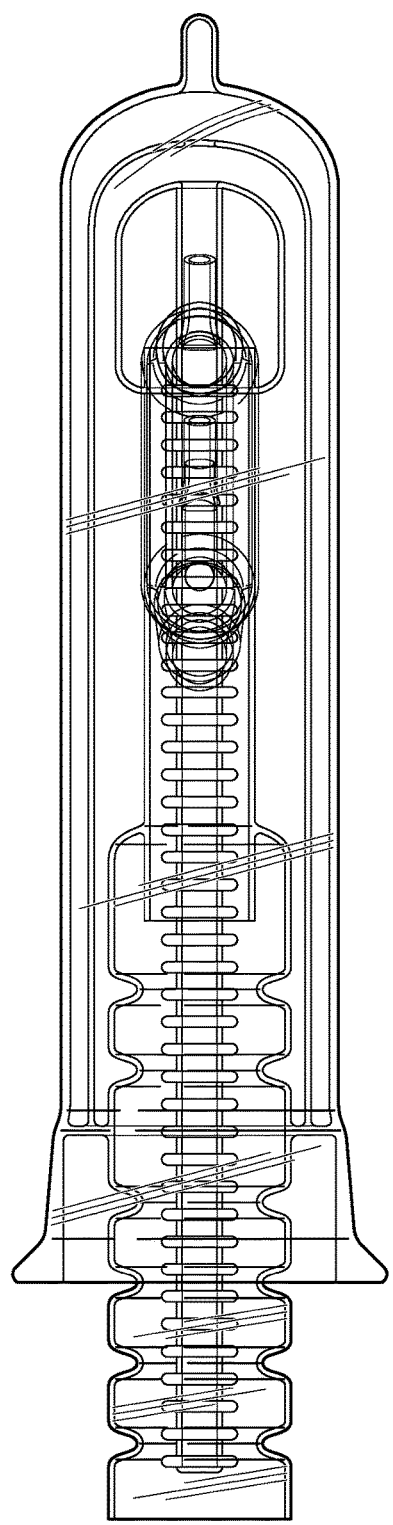
FIG. 13 shows a back elevation view of the distillation unit of FIG. 8.
Figure 14:
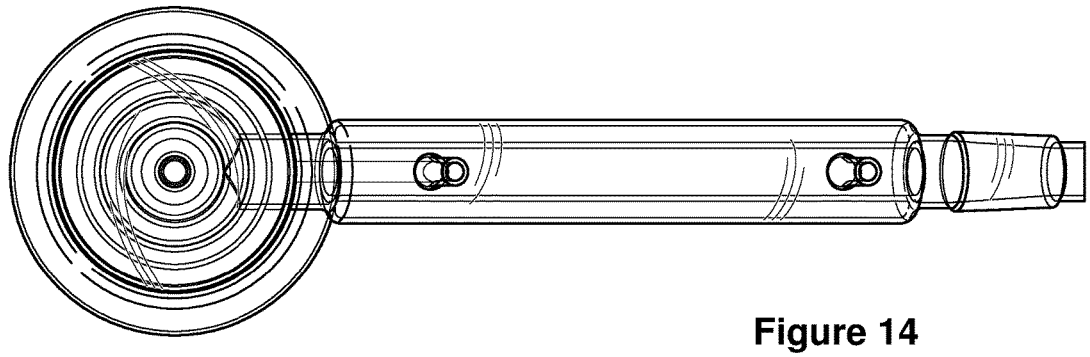
FIG. 14 shows a top plan view of the distillation unit of FIG. 1.
Figure 15:
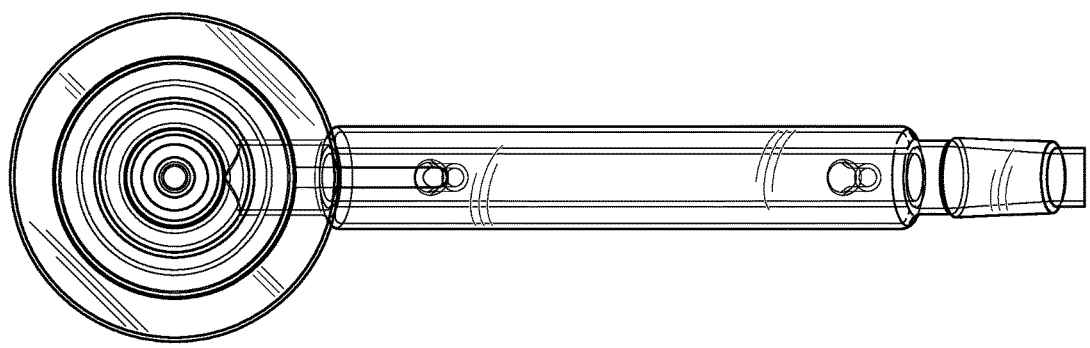
FIG. 15 shows a bottom plan view of the distillation unit of FIG. 1.
Figure 16:
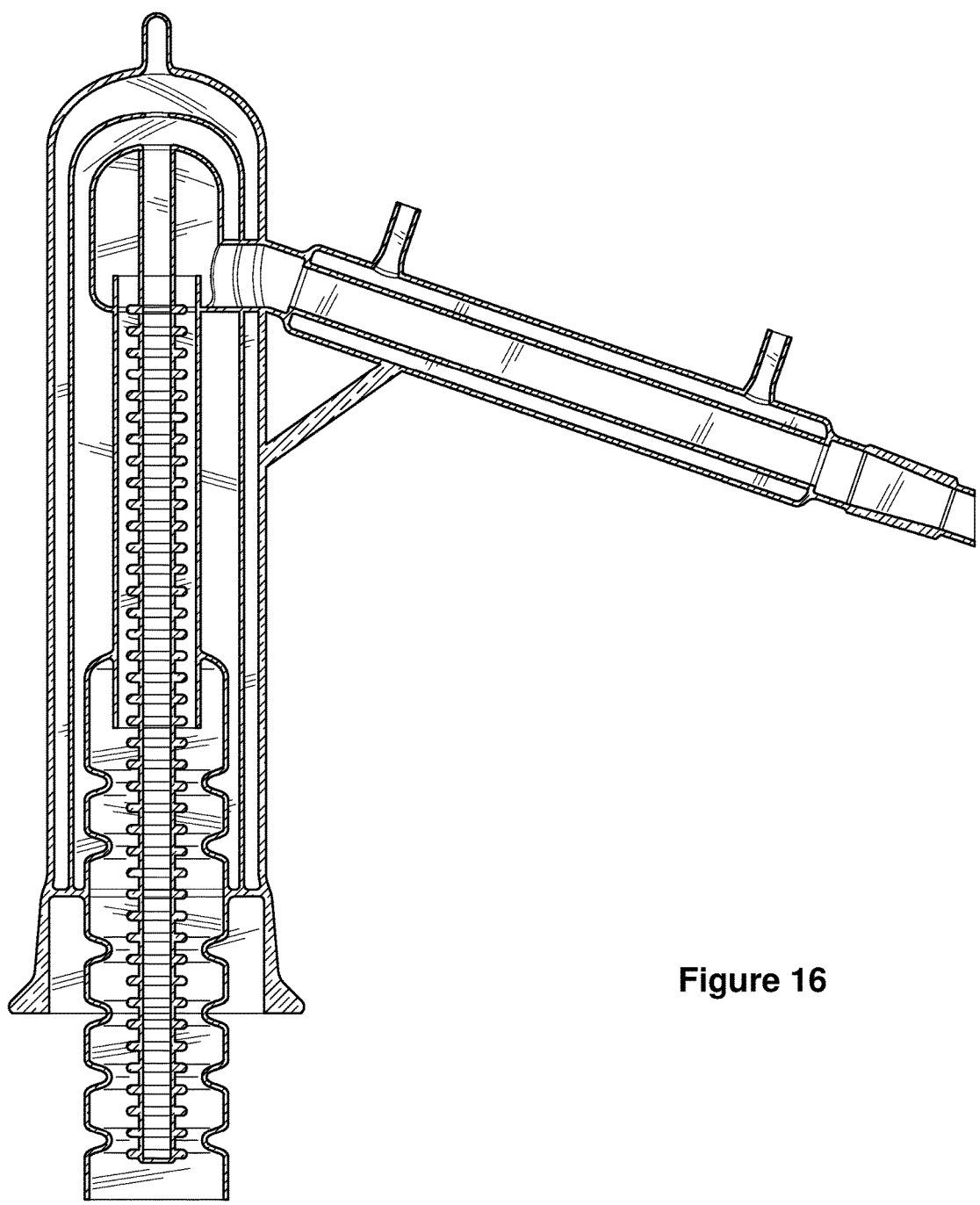
FIG. 16 shows a cutaway side elevation view of the distillation head of FIG. 12 cut along section line 12-12.

FIGS. 9 through 16 show a variation without the stopper 300, connecting region between the exit port and condensation tube 220, and the vertical connecting region 230 between the connecting region condensation tube. FIG. 9 shows a side elevation view of the distillation head of FIG. 8. FIG. 10 shows a top perspective view of the distillation unit of FIG. 8. FIG. 11 shows a bottom perspective view of the distillation unit of FIG. 8. FIG. 12 shows a front elevation view of the distillation unit of FIG. 8. FIG. 13 shows a back elevation view of the distillation unit of FIG. 8. FIG. 14 shows a top plan view of the distillation unit of FIG. 1. FIG. 15 shows a bottom plan view of the distillation unit of FIG. 1. FIG. 16 shows a cutaway side elevation view of the distillation head of FIG. 12 cut along section line 12-12.

In the embodiment shown in FIGS. 9 through 16, the vertical portion of the distillation unit (parts numbered between 10 and 50, inclusive) are identical to those of the embodiment of FIGS. 1 through 8. The condensation chamber 250 is also identical or substantially identical, but the there is no stopper (300). In this embodiment the condenser 250 is connected at an acute angle to the vertical length (most elongated vertical side) of the distillation head. Thus, condensate from the fraction collector 50 exits therefrom at a horizontal angle and/or acutely down angle in an unencumbered path.

FIG. 17 shows a perspective view of a shorter version of the distillation head in another embodiment of the disclosed technology. FIG. 18 shows a side elevation view of the shorter version of the distillation head of FIG. 17. Here the length of the middle distillation tube 45 has been shortened compared to the prior embodiments. The length of the lower distillation tube 10 has also been shortened comparatively. However, the top and bottom extremities of each tube 10 and 45 remain identical to the prior embodiments and function as described with respect to such prior embodiments. It should be understood that "length" refers to a vertical direction (from top to bottom) in this disclosure.

Figure 19:
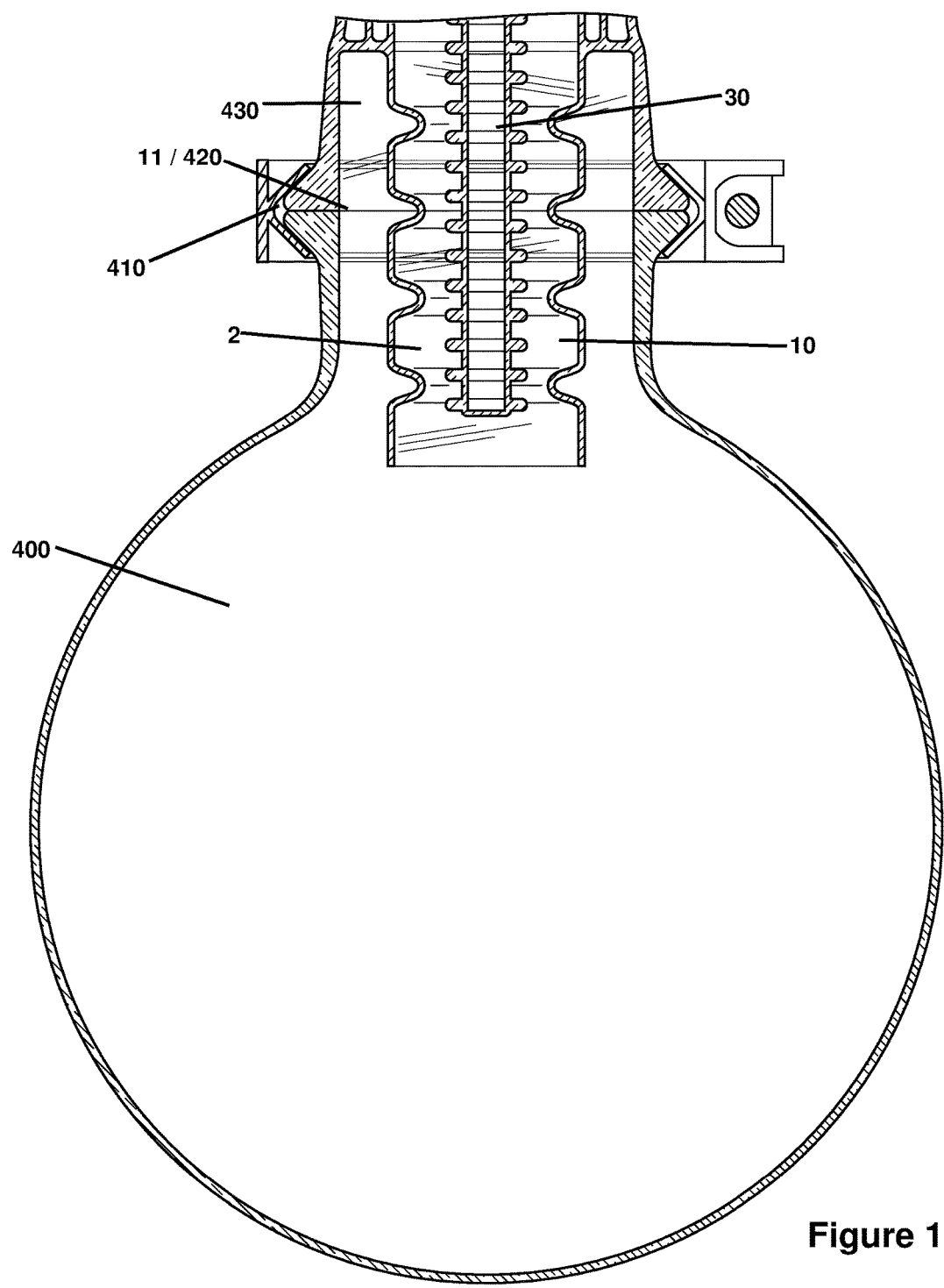
FIG. 19 shows a side cutaway view of a distillation unit within a flask in an embodiment of the disclosed technology.
Figure 20:
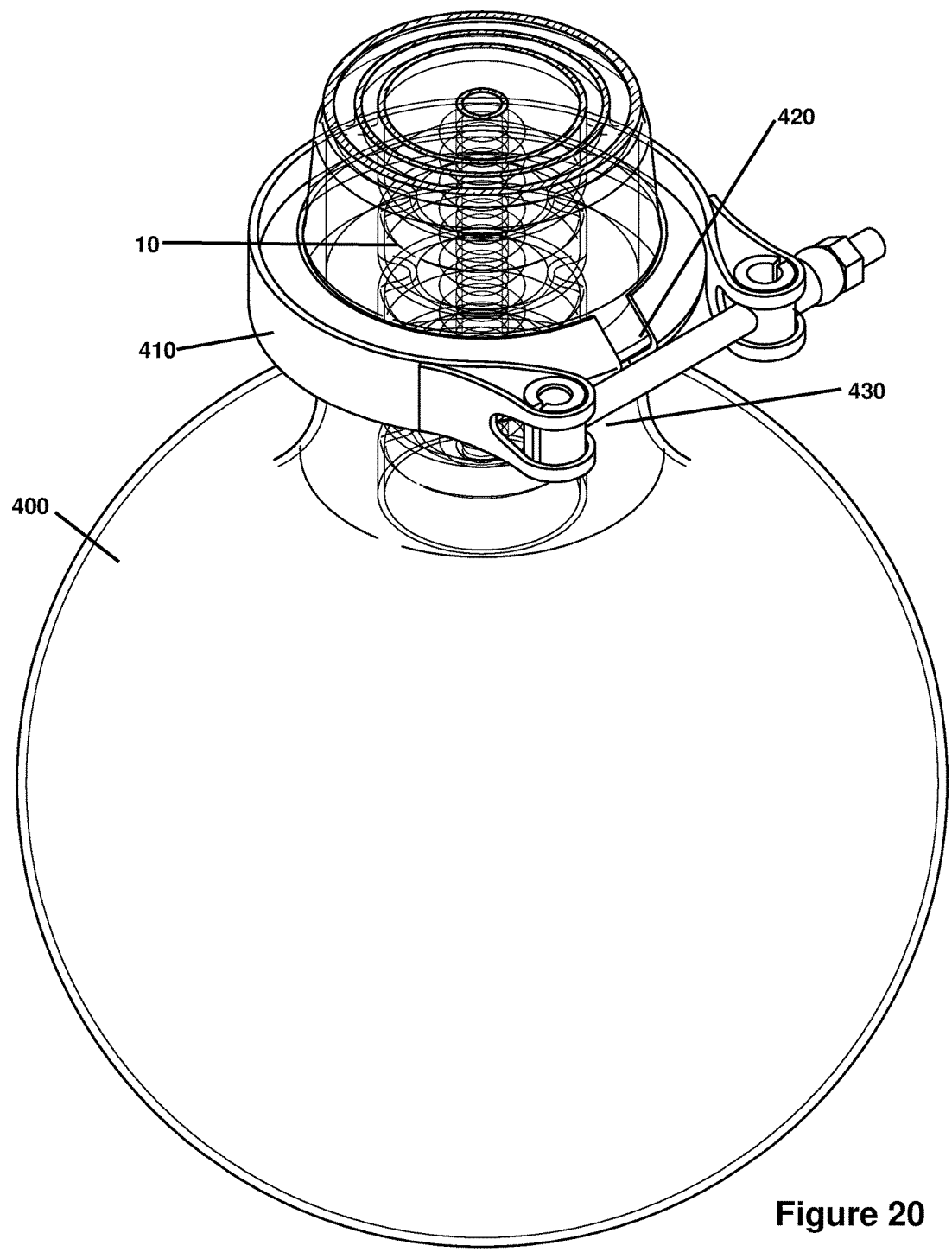
FIG. 20 shows a top and side perspective view of a distillation unit within a flask in an embodiment of the disclosed technology.

FIG. 19 shows a side cutaway view of a distillation unit within a flask in an embodiment of the disclosed technology. FIG. 20 shows a top and side perspective view of a distillation unit within a flask in an embodiment of the disclosed technology. Here, the lower connection region 20 of the distillation head unit 1 is abutted against the opening 420 into the flask forming seal. The lower distillation tube 10 extends into the neck 430 of the flask and can extend into the body of the flask. The "neck" is defined as a narrower region connecting to a bulbous or wider body. In embodiments, the "neck" has a width which is no wider than 40% of the widest width of the flask and the body of the flask is defined as a portion which is at least as wide as 40% of the widest width of the flask. In other embodiments, such as shown in FIGS. 19 and 20, the neck 430 has substantially vertical and/or planar side walls and the body has rounded side walls and/or a change in slope of the continuous walls of greater than 25%.

A clamp 410 clamps the bottom region 20 of the distillation head to the flask opening 420. Thus, the bottom opening 11 into the distillation head is in-line with the top opening 420 of the flask in embodiments of the disclosed technology and is held together by a clamp 410. An interior space in the neck 430 creates a rejection region for vapors between the walls of the neck and the lower distillation tube 10. Further, the lower distillation tube 10 is surrounded by the interior space of the flask which creates a sort of jacket around the lower tube to maintain heat flow, with the distillation key 30 extending into the flask itself.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A distillation unit comprising:
    a jacket;
    a crimped glassware lower distillation tube partially surrounded by said jacket;
    a middle distillation tube extending into a region circumscribed by said lower distillation tube;
    a fraction collector which circumscribes said middle distillation tube.

2. The distillation unit of claim 1, further comprising:
    a distillation key with a plurality of circumferential rings extending transverse to a length of said distillation key;
    wherein said distillation key extends entirely through a vertical extent of said fraction collector and said middle distillation tube while being entirely spaced apart from said middle distillation tube.

3. The distillation unit of claim 2, wherein said distillation key is further entirely spaced apart from said lower distillation tube.

4. The distillation unit of claim 3, wherein said distillation key forms a unitary structure with said jacket.

5. The distillation unit of claim 1, wherein a portion of said lower distillation tube is unprotected by any insulative region including said jacket.

6. The distillation unit of claim 5, wherein said portion of said lower distillation tube unprotected by any said insulative region is held within a flask and a heat source is applied to said flask.

7. The distillation unit of claim 6, wherein a bellowed region of said jacket abuts said flask while a portion of said lower distillation tube is surrounded by said flask.

8. The distillation unit of claim 1, wherein a first rejection area for vapors is between upper walls of said lower distillation tube and outer walls of said middle distillation tube.

9. The distillation unit of claim 8, wherein a second rejection area for vapors is created between walls of said lower distillation tube and upper walls of said flask.

10. The distillation unit of claim 1, wherein said fraction collector has a bulbous shape with a rounded upper side and flat lower side.

11. The distillation unit of claim 10, wherein said fraction collector comprises a bottom side which is perpendicular to a longest vertical length of said jacket and said middle distillation tube.

12. The distillation unit of claim 11, wherein a connecting region between said fraction collector and a condenser comprises an exit portal there-between and said bottom side of said fraction collector and at least a portion of said connecting region are coplanar.

13. The distillation unit of claim 1, comprising a continuous internal pathway extending through, in order:
    an interior of said lower distillation tube;
    said middle distillation tube;
    said fractional collector;
    a side exit portal passing through said jacket and normal to said middle distillation tube; and
    a condenser.

14. The distillation unit of claim 13, wherein at least some vapors extending upwards through said pathway are rejected at a top of said interior of said lower distillation tube; and
    at least some said vapors are rejected by at least some rings of a distillation key, said distillation key extending through without contacting said middle distillation tube and at least a majority of said lower distillation tube.

15. The distillation unit of claim 14, wherein said crimped glassware further comprises at least two inner crimps having a smaller cross sectional area than a widest extent of said lower distillation tube.

16. The distillation unit of claim 15, wherein said at least two inner crimps create turbulent flow of said at least some vapors.

17. A distillation unit comprising:
    a distillation key attached to a top side of said distillation unit;
    a fraction collector through which said distillation key extends through from end to end entirely;
    a middle distillation tube narrower than said fraction collector through which said distillation key extends through from end to end entirely;
    a lower distillation tube wider than said middle distillation tube through which said distillation key extends at least partially there-through.

18. The distillation unit of claim 17, wherein said middle distillation tube extends into both said fractional collector and said lower distillation tube.

19. The distillation unit of claim 18, wherein where said middle distillation tube extends into said lower distillation tube, an area between said lower distillation tube and said middle distillation tube terminates an upward pathway from a lower opening of said lower distillation tube.

20. The distillation unit of claim 19, wherein said lower distillation tube comprises a plurality of alternatively wider and narrower regions.

21. The distillation unit of claim 20, wherein said distillation key comprises alternating areas with greater cross sections only at a portion of said distillation key within said middle distillation tube and said lower distillation tube.

* * * * *